US005771138A

United States Patent [19]
Zarouri et al.

[11] Patent Number: 5,771,138
[45] Date of Patent: Jun. 23, 1998

[54] HEAD GIMBAL ASSEMBLY WITH TRANSDUCER WIRES ATTACHED AT TWO POINTS TO SLIDER

[75] Inventors: Mourad D. Zarouri, San Diego; Navrit Singh, Santa Clara; Thomas J. Bower, San Luis Obispo, all of Calif.

[73] Assignee: Read-Rite Corporation, Milpitas, Calif.

[21] Appl. No.: 686,273

[22] Filed: Jul. 25, 1996

Related U.S. Application Data

[63] Continuation of Ser. No. 404,737, Mar. 15, 1995, abandoned.

[51] Int. Cl.$^6$ .................................................... G11B 5/48
[52] U.S. Cl. ............................................................. 360/104
[58] Field of Search ................................. 360/103, 104, 360/105

[56] References Cited

U.S. PATENT DOCUMENTS

| | | | |
|---|---|---|---|
| 5,006,946 | 4/1991 | Matsuzaki | 360/104 |
| 5,111,351 | 5/1992 | Hamilton | 360/104 |
| 5,126,903 | 6/1992 | Matsuzaki | 360/104 |
| 5,166,845 | 11/1992 | Thompson et al. | 360/104 |
| 5,296,983 | 3/1994 | Blanc et al. | 360/104 |
| 5,305,167 | 4/1994 | Nagase et al. | 360/103 |
| 5,331,489 | 7/1994 | Johnson et al. | 360/104 |
| 5,343,344 | 8/1994 | Nagase | 360/104 |
| 5,384,432 | 1/1995 | Noro et al. | 360/104 |
| 5,463,513 | 10/1995 | Hoshino | 360/104 |
| 5,491,597 | 2/1996 | Bennin et al. | 360/104 |
| 5,526,205 | 6/1996 | Aoyagi et al. | 360/104 |
| 5,530,604 | 6/1996 | Pattanaik | 360/104 |
| 5,557,489 | 9/1996 | Nakashima et al. | 360/104 |

FOREIGN PATENT DOCUMENTS

| | | | |
|---|---|---|---|
| 60-246015 | 12/1985 | Japan | 360/103 |
| 4-40680 | 2/1992 | Japan | 360/103 |
| 6-68445 | 3/1994 | Japan | 360/103 |

*Primary Examiner*—Stuart S. Levy
*Assistant Examiner*—Brian E. Miller
*Attorney, Agent, or Firm*—Nathan N. Kallman

[57] ABSTRACT

A head gimbal assembly for use in disk drive systems comprises a load beam, a flexure connected to the load beam, an air bearing slider connected to the flexure which includes a transducer and a plurality of bonding pads and a plurality of transducer wires, wherein each transducer wire is physically connected at a first point on the load beam and to a first location on said slider and to one of the bonding pads. The flexure, slider and first length of each transducer wire between the first location on the slider and the bonding pads form an integral unit which moves as a single unit during operation of a disk drive. The transducer wires have a second length between the first point on the load beam and the first location on the slider such that the stiffness of the second length does not restrict movement of the integral unit. The second length of the transducer wires and the integral unit coact to maintain freedom of movement and the flying characteristics of the slider and each transducer wire exerts negligible stress on the bond between the transducer wire and the bonding pad.

5 Claims, 5 Drawing Sheets

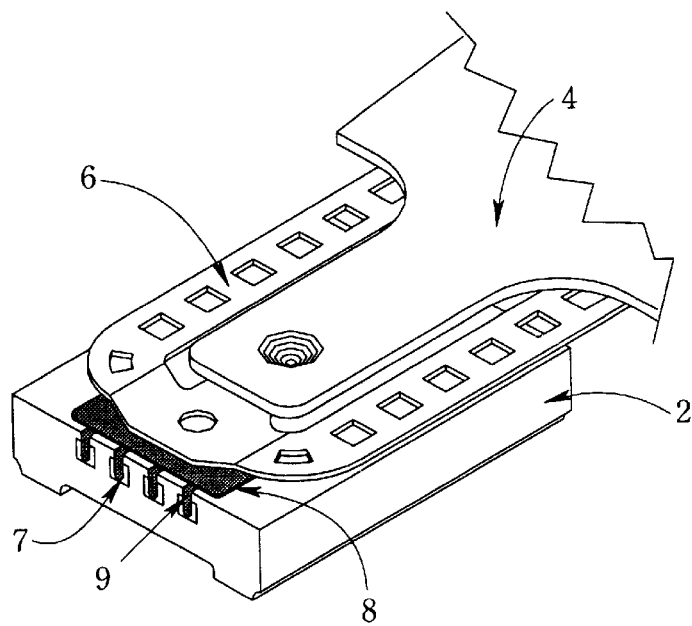
FIG IE
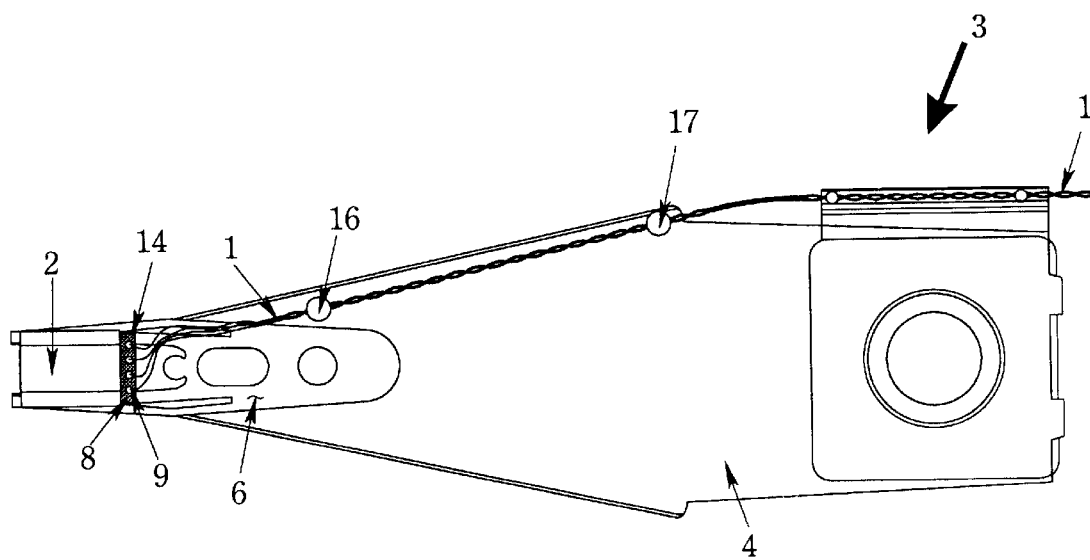
FIG IF

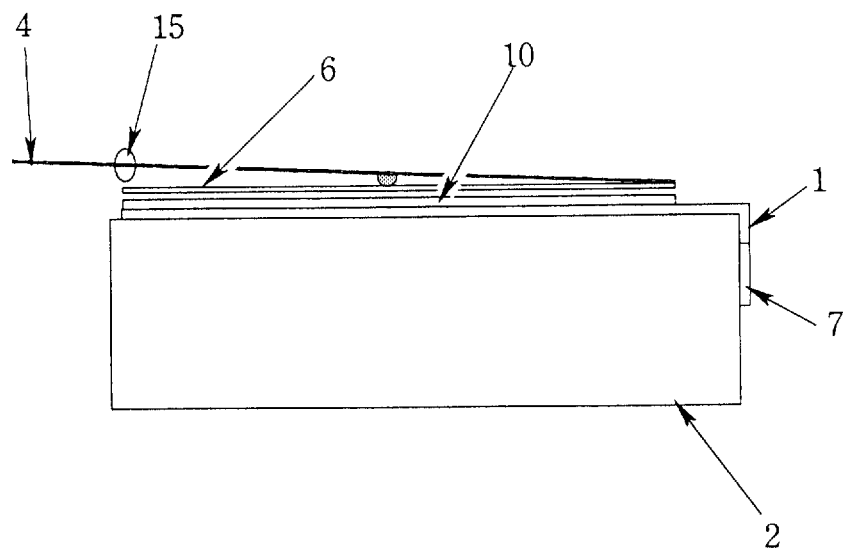
FIG IC
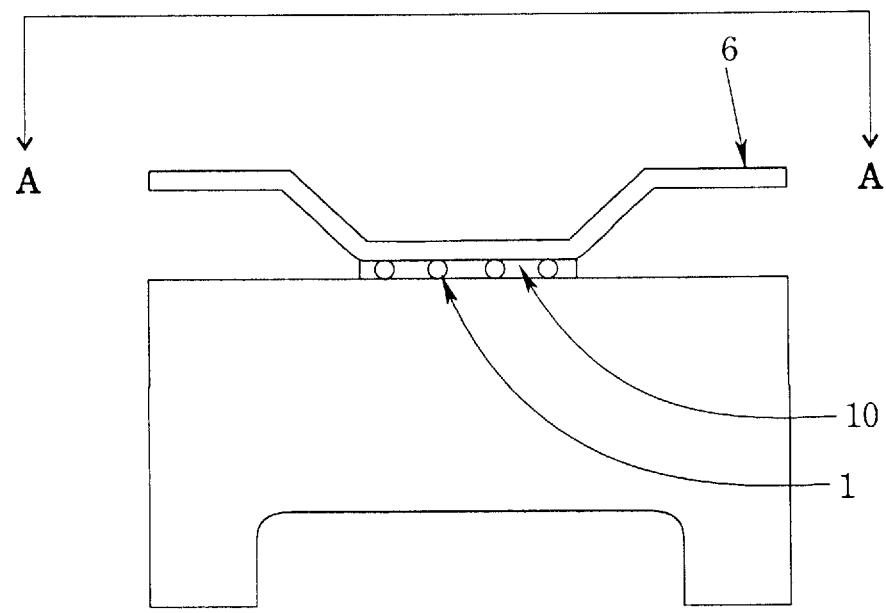
FIG ID

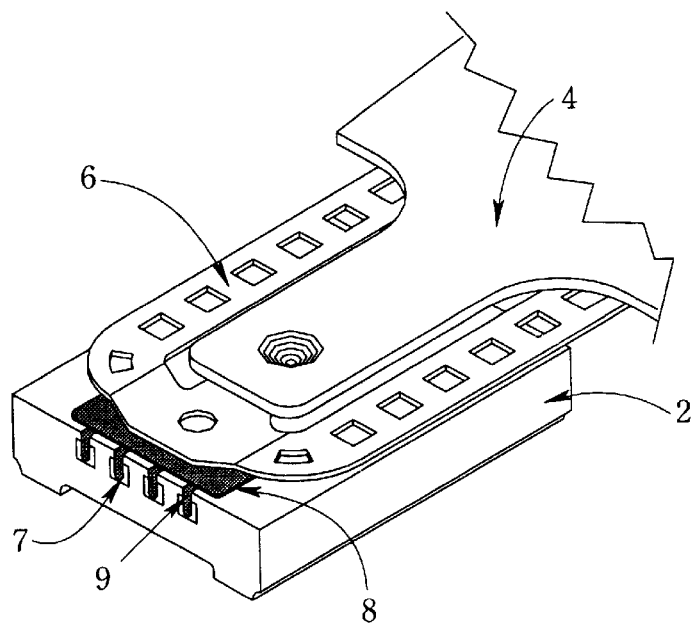
FIG IE
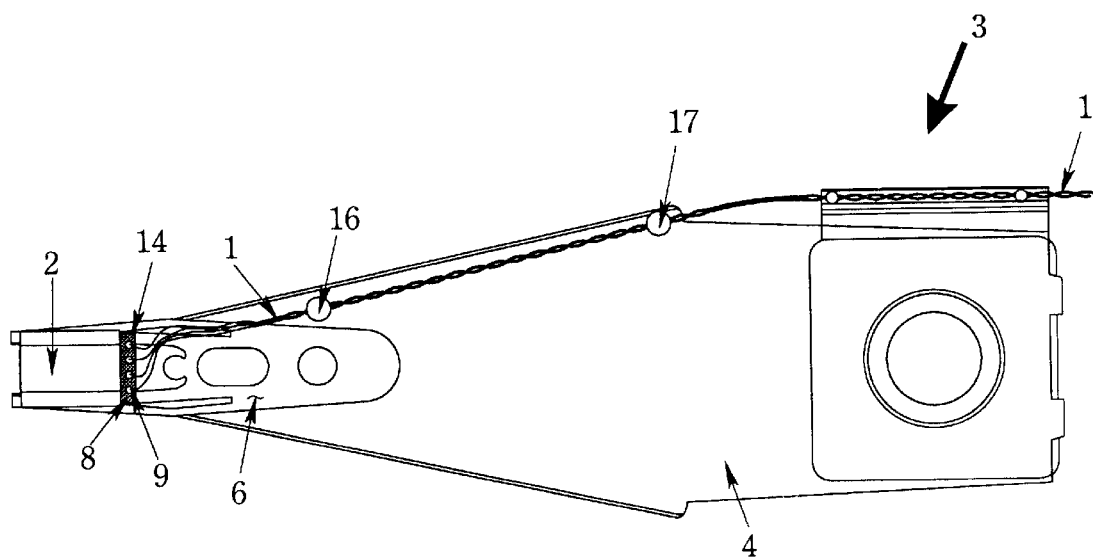
FIG IF

HEAD GIMBAL ASSEMBLY WITH TRANSDUCER WIRES ATTACHED AT TWO POINTS TO SLIDER

This application is a continuation of application Ser. No. 08/404,737, filed Mar. 15, 1995, now abandoned.

FIELD OF THE INVENTION

This invention relates to head gimbal assemblies used in magnetic disk drive storage systems and in particular to the attachment of transducer wires within the head gimbal assembly.

BACKGROUND OF THE INVENTION

Typically, a disk drive contains a number of magnetic disks attached to a common spindle for rotation. The surfaces of the magnetic disks have an associated head arm assembly which includes a head gimbal assembly (HGA). The head arm assemblies are generally attached to an actuator for positioning magnetic transducers formed with the HGAs with reference to data tracks on the magnetic disks. In an effort to make disk drives smaller, disk drive manufacturers attempt to make the space required for the HGAs between adjacent magnetic disk surfaces as small as possible.

A HGA typically comprises a slider which supports a transducer. The slider is attached to a flexure which in turn is attached to a load beam. Transducer wires are connected to the transducer to conduct signals between the transducer and head circuitry. The load beam exerts a force on the flexure/slider combination towards the surface of a disk. As the disk is rotated an air bearing is created between the bottom of the slider and the surface of the disk which exerts a force on the HGA away from the surface of the disk in opposition to the load beam force. The resultant force causes the slider to fly at a very small distance from the surface of the rotating disk. The flexure allows the slider to pitch and roll and move freely in three dimensions so as to follow the air bearing surface.

The transducer can be an inductive type transducer which requires two transducer wires or a magnetoresistive (MR) type transducer which requires four transducer wires for conducting current. The transducer may be a thin film transducer which is deposited directly onto the slider or the transducer can be composed of separate elements which are carried by the slider such that the slider and transducer become an integral unit. Over time the size of the slider has been progressively reduced thereby allowing an increase in data track density and accordingly an increase in data storage capacity.

The slider size has decreased from a standard size to a micro size (70% of standard) to a nano size (50% of standard) to a pico size (30% of standard) and to a femto size (25% of standard.

The stiffness of a wire is a function of the diameter, i.e. gauge and the length of the wire. As the wire length becomes shorter the stiffness of the wire increases. As the diameter of the wire decreases the stiffness decreases, and the resistivity of the wire increases resulting in a decrease in the signal-to-noise ratio. A wire is bonded to the transducer at different points and the length of the wire between the two bonding points defines the stiffness of the wire.

In prior art head assemblies, a transducer wire is attached to a bonding pad on the slider and to a point on the load beam. The stiffness of the transducer wire places stress on the bond between the bonding wire and the bonding pad, which adversely affects the freedom of movement of the flexure and slider and thus the overall flying characteristics of the slider. In order to reduce these adverse effects of the transducer wires on the HGA, the prior art approach has been to lengthen the transducer wires as much as possible to form a loop between the bonding point of the transducer wires on the load beam and the bonding pads on the slider. This loop is referred to as a service loop.

In a standard size slider, transducer wires that are used with inductive type transducers are typically 44 gauge, having a wire diameter of 0.002 inches, and have a service loop length of about 0.2 inch which yielded a relative stiffness of 0.5 for the two transducer wires.

In a nano size slider, the transducer wires that are used with inductive type transducers were reduced to 48 gauge, having a wire diameter of 0.0012 inches, and have a service loop length of about 0.15 inch which yielded a relative stiffness of 0.36 for the two transducer wires.

When an MR type transducer is used, the four transducer wires are of 48 gauge having a wire diameter of 0.0012 inches, and a service loop length of about 0.15 inch. These dimensions resulted in undesirable relative stiffness of 0.73 for the four transducer wires. To reduce the relative stiffness of the four transducer wires, the transducer wire size can be changed to 50 gauge, a wire diameter of 0.001 inch, and if the service loop length remains at 0.15 inches, the relative stiffness will be decreased to 0.36 for the four transducer wires. The increase in the gauge of the transducer wires will have the adverse effects of increasing the resistivity of the wires thereby decreasing the signal-to-noise ratio characteristic of the transducer wires.

FIGS. 4A, 4B and 4C represent prior art HGAs and illustrate the present routing of the four transducer wires 1 to an MR transducer on slider 2 for an HGA 3. FIGS. 4A–4C illustrate the four wires 1 being routed along the edge of load beam 4 and bonded to load beam 4 at point 5. The wires 1 then are directed over the top of the flexure 6 to bonding pads 7 which connect the transducer wires 1 to the transducer. The size of the service loop is the wire length between point 5 and bonding pads 7. This routing of the four wires 1 over the top of flexure 6 has the adverse effect of increasing the spacing between adjacent magnetic disk surfaces thereby increasing the overall size of the disk drive, particularly the height or the Z direction.

FIG. 4B illustrates the four transducer wires 1 being routed along the edge of load beam 4. The transducer wires 1 are divided into two groups where the first group of transducer wires is bonded to load beam 4 at point 8 and the second group of transducer wires is bonded to load beam 4 at point 9. Each group of wires forms a service loop along one side of slider 2 to bonding pads 7. The size of one service loop is the transducer wire length between point 8 and bonding pads 7 and the size of the other service loop is the transducer wire length between point 9 and bonding pads 7. This transducer wire routing has the advantages of decreasing the space between adjacent magnetic disk surfaces and the use of two service loops aids in maintaining the stability and flying characteristic of the slider. This routing has the disadvantage of restricting how close the HGA 3 can come to the disk drive spindle because the service loops will be the first point of contact with the spindle, thereby decreasing the number of usable tracks on each magnetic disk surface.

FIG. 4C illustrates the four wires 1 being routed along the edge of load beam 4 and bonded to load beam 4 at point 5.

At point 5, a service loop is formed by routing the transducer wires along the non-spindle side of slider 2 to bonding pads 7. The size of the service loop is the transducer wire 1 length between point 5 and bonding pads 7. This routing of the wires has the advantages of decreasing the space between adjacent magnetic disk surfaces and allowing a close spacing between the HGA 3 and the spindle because a service loop will no longer be the first point of contact with the spindle. This routing has the disadvantage that the service loop will bias the slider on one side thereby adversely affecting the flying characteristic of the slider.

SUMMARY OF THE INVENTION

In accordance with this invention, the transducer wires of an HGA are bonded to the body of the slider and each transducer wire is bonded to a bonding pad on the slider so that each transducer wire between the bonding point on the slider and the bonding pad becomes an integral part of the slider. Because the transducer wires are now an integral part of the slider, the transducer wires will exert minimal stress on the bond between the transducer wires and the bonding pads and will allow free movement of the slider gimbal assembly. A secondary loop is formed to the rear of the slider between the bonding point on the slider and the bonding point on the load beam of sufficient length so as to allow free movement of the slider flexure assembly. By bonding the transducer wires to the body of the slider, the flying characteristics of the slider are maintained, the spacing between magnetic disks is minimized and the number of usable tracks on the magnetic disks is maximized.

The advantages of the invention are that it:

1. Enables disk drive manufacturers to have tighter disk-to disk spacing;
2. Enables disk drive manufacturers to pack more tracks per disk surface by allowing the slider to fly closer to the spindle hub;
3. Eliminates flying height variations induced by the service loop or loops:
4. Eliminates any disturbances/noise induced in the service loop due to variation in the flying height of the slider;
5. Simplifies head assembly process;
6. Facilitates elimination of conformal coating presently placed upon bonding pads after the transducer wires have been bonded to the bonding pad by reducing the strain upon the bond itself;
7. Eliminates need for high bond strength thereby possibly eliminating the need to strip the insulation from the transducer wires before bonding, since successful bonding can be obtained without first stripping the transducer wires, although the resulting bond will still be electrically acceptable but weaker in strength;
8. Allows the use of higher gauge wire to decrease the resistance and increase the signal-to-noise ratio;
9. Minimizes the overall length of each transducer wire since there is no service loop;
10. Eliminates nicked wires in the service loop regions which is a major defect that can occur during manufacturing;
11. Is easier to manufacture head gimbal assembly because there is no service loop to be damaged during handling and cleaning;
12. Removes the concern over wire stiffness especially for pico size sliders and transducers; and
13. Allows the transducer wires to define the orientation of the slider to the flexure instead of the use of glass bead in the adhesive, as used in the prior art to bond the slider to the flexure.

BRIEF DESCRIPTION OF THE DRAWINGS

The invention will be described in greater detail with reference to the accompanying drawings, in which:

FIG. 1A is an isometric view of a head gimbal assembly incorporating the invention;

FIG. 1B is an enlarged view of the flexure, slider and transducer wires bonded to the bonding pads on the slider of the HGA, shown in the dashed circular area of FIG. 1A;

FIG. 1C is an enlarged side view (not to scale) of the HGA of FIG. 1A;

FIG. 1D is an enlarged cross-section view (not to scale) along line AA of FIG. 1B demonstrating the transducer wires establishing a coplanar relationship between the flexure and the slider;

FIG. 1E is an enlarged view of the flexure, slider and a flex circuit bonded to the bonding pads on the slider of the head gimbal assembly of FIG. 1A.

FIG. 1F is a bottom view of the load beam, flexure, slider illustrating the bonding points of the transducer wires and the connection of the transducer wires to the flex circuit of FIG. 1E.

Figure 2:
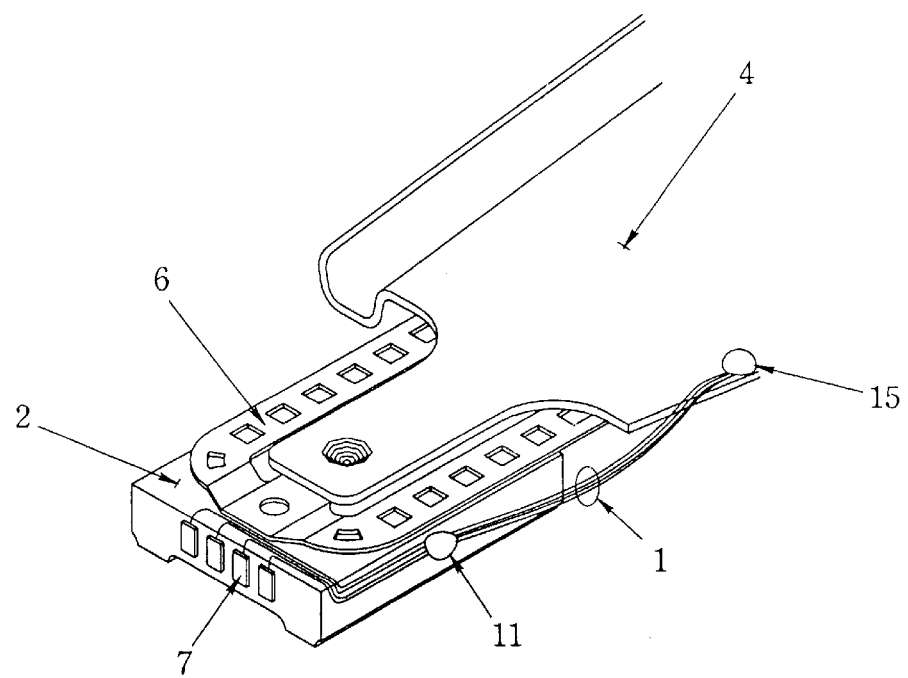
FIG. 2 illustrates an exploded view of an alternative embodiment of the invention where the transducer wires are first bonded to the side of the slider of the head gimbal assembly.

It should be noted that the drawings are not necessarily to scale and of accurate proportions but are used to illustrate and describe the invention.

DETAILED DESCRIPTION OF THE INVENTION

FIGS. 1A, 1B, 1C and 1D show an HGA 3 comprised of a load beam 4, flexure 6, slider 2, four transducer wires 1, and four bonding pads 7, preferably of gold. Transducer wires 1 are routed along the edge of load beam 4 and are bonded to the load beam 4 at points 15 and 16. The four transducer wires 1 are routed from load beam 4 to the rear of the flexure slider assembly (shown in FIG. 1C) and then through the bonding material 10 between the bottom of flexure 4 and the top of slider 2 so as to maintain a coplanar relationship between the bottom of flexure 6 and slider 2 (as shown in FIG. 1D). The length of the transducer wires 1 from the rear of the flexure slider assembly to point 15 allows free movement of the flexure slider/assembly. Adhesive material 10 bonds together flexure 6, transducer wires 1 and slider 2 to form an integral unit such that flexure 6, transducer wires 1 and slider 2 move as a single unit thereby maintaining the freedom of movement and desired flying characteristics of the slider. The end of each of the four transducer wires 1 is bent over the top forward edge of slider 2 and ultrasonically bonded to one of the gold bonding pads 7.

FIG. 1E illustrates the four transducer wires 1 replaced by flex circuit 8 where the flex circuit 8 contains four conductors 9. Each of the four conductors 9 is bonded to one of the gold bonding pads 7. The flex circuit 8 is located between the flexure 6 and the slider 2. The flex circuit 8, the flexure 6 and the slider 2 are all bonded together by bonding material such as an epoxy or a glue. FIG. 1F is a bottom view of the HGA 3 where the four transducer wires 1 are routed along the bottom of load beam 4 and bonded to load beam 4 at points 16 and 17. Each transducer wire 1 is bonded to a conductor 9 of flex circuit 8 at the rear of slider 2 at point 14. The transducer wires 1 form a secondary loop between point 16 and point 14 to reduce the stiffness of the four transducer wires thereby maintaining the freedom of motion and the flying characteristics of slider 2.

FIG. 2 shows another embodiment of the invention where the HGA comprises load beam 4, flexure 6, slider 2, four transducer wires 1, and four bonding pads 7. Transducer wires 4 are routed along the edge of load beam 4 and are bonded to the load beam at point 15. The four transducer wires 1 are bonded to the side of slider 2 at point 11. The length of the transducer wires 1 between points 15 and 11 forms a secondary loop from the load beam and along the side of the slider; the rear of the slider 2 thereby maintaining the freedom of motion and the flying characteristics of slider 2. Slider 2 may be bonded by bonding material containing glass beads to maintain a spatial relationship between the bottom of flexure 6 and the top of slider 2. Flexure 6, slider 2 and transducer wires 1 between point 11 and the bonding pads 7 form an integral unit such that flexure 6, transducer wires 1 and slider 2 move as a single unit. The end of each of the four transducer wires 1 is bent around the forward side edge of slider 2 and ultrasonically bonded to one of the gold bonding pads 7.

Figure 3:
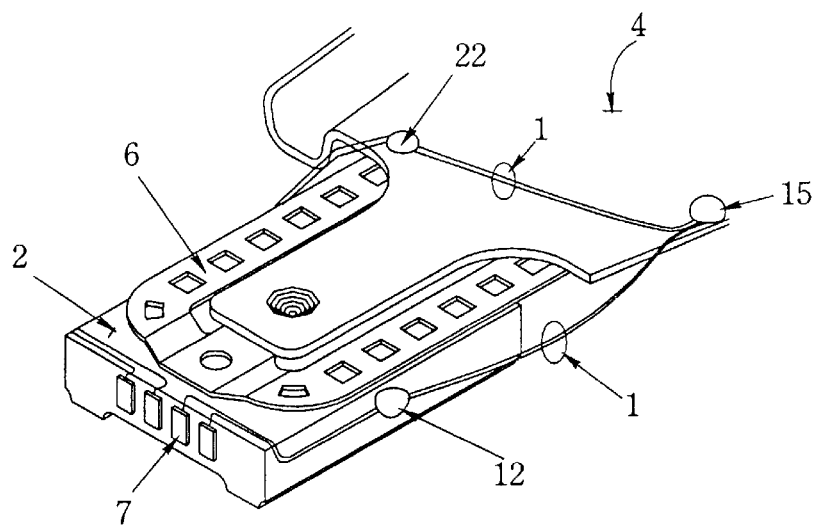
FIG. 3 illustrates still another embodiment of the invention where the transducer wires are divided into two groups of transducer wires and each group of transducer wires are first bonded to a side of the slider of the head gimbal assembly.
Figure 4A:
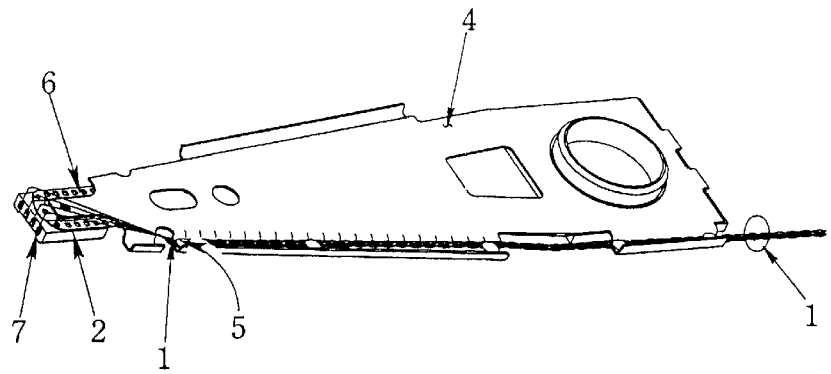
FIG. 4A illustrates the prior art over the top routing of four transducer wires in a head gimbal assembly.
Figure 4B:
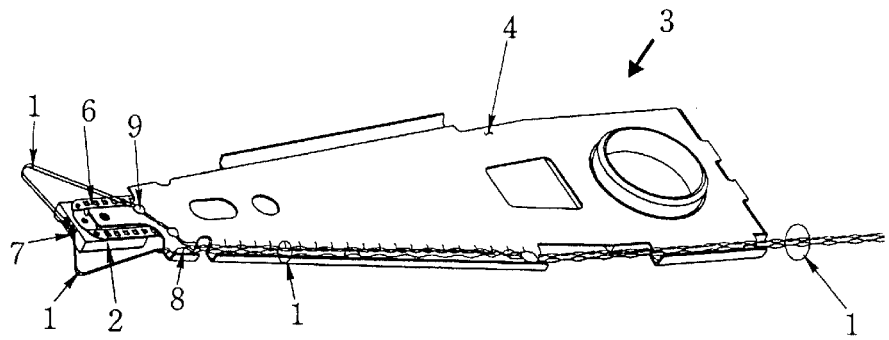
FIG. 4B illustrates the prior art two-side routing of four transducer wires in a head gimbal assembly.
Figure 4C:
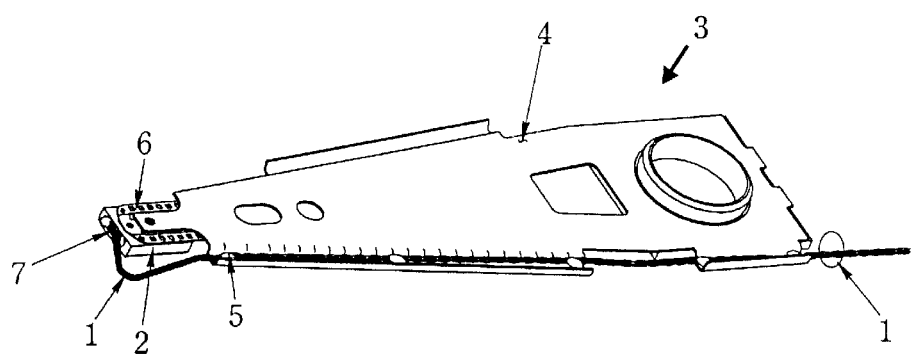
FIG. 4C illustrates the prior art one-side routing of four transducer wires in a head gimbal assembly.

FIG. 3 shows another embodiment of the invention where the HGA comprises load beam 4, flexure 6, slider 2, four transducer wires 1 and four gold bonding pads 7. The four transducer wires 1 are routed along the edge of load beam 4 and are bonded to load beam 4 at point 15. The four transducer wires 1 are divided into two groups where each group contains two transducer wires. A first group of transducer wires 1 is bonded to one side of slider 2 at point 12. The second group of transducer wires 1 is directed across load beam 4 and is bonded to load beam 4 at point 22. The second group of transducer wires 1 is then bonded to the other side of slider 2 at a point 13 (not shown) spaced from point 22. Each of the transducer wires 1 are then bent around one of the edges of slider 2 and bonded to one of the bonding pads 7. The length of the transducer wires 1 in the first group between point 15 and 12 and of the transducer wires 1 in the second group between points 22 and 13 form a secondary loop thereby maintaining the freedom of motion and the flying characteristics of slider 2. Flexure 6, slider 2 , the transducer wires 1 between point 12 and the bonding pads and the transducer wires 1 between point 13 and the bonding pads form an integral unit and move together. Slider 2 may be bonded by bonding material containing glass beads to maintain a spatial relationship between the bottom of flexure 6 and the top of slider 2.

It should be understood that modifications may be made and that the parameters, materials and dimensions may be changed without departing from the scope of the invention.

What is claimed is:

1. A head gimbal assembly for use in a disk drive having a plurality of magnetic disks comprising:

a load beam:

a flexure physically connected to said load beam;

an air bearing slider attached to said flexure for movement with said flexure, said slider including a transducer and a plurality of transducer bonding pads for electrical connection to said transducer; and a plurality of transducer wires, one end portion of each wire being connected by adhesive at a first point to said load beam, the other end portion of each of said transducer wires being connected by adhesive directly to the body of said slider at a first location on said slider other than said transducer bonding pads thereby forming a secondary wire loop, said other end portion of each of said transducer wires being connected at said first location and continuing to connect to respective ones of said plurality of transducer bonding pads on said slider without intermediate connections to form a first wire loop;

said flexure, said slider, and a first length of each of said plurality of transducer wires between said first location on said slider and said plurality of transducer bonding pads that form said first wire loop combining as an integral unit which moves as a single unit during operation in a disk drive;

said plurality of transducer wires each having a second length between said first point on said load beam and said first location on said slider to form said secondary wire loop with minimal overall length of each transducer wire, said wires being routed along the bottom or the edge of said load beam, so that said integral unit and said secondary wire loop coact to maintain freedom of movement and flying characteristics of said slider, whereby said plurality of transducer wires exerts negligible stress on the electrical connection between said plurality of transducer wires and said plurality of transducer bonding pads.

2. The head gimbal assembly of claim 1 wherein said plurality of transducer wires are divided into two groups; and said first location for each of said groups is located on opposite sides of said slider.

3. The head gimbal assembly of claim 1 wherein said transducer is a magnetoresistive transducer and wherein said plurality of transducer wires comprises four transducer wires.

4. The head gimbal assembly of claims 1 wherein said slider is of a pico size.

5. The head gimbal assembly of claim 1 wherein said slider is of a nano size.

* * * * *